United States Patent [19]
Neely

[11] Patent Number: 5,745,874
[45] Date of Patent: Apr. 28, 1998

[54] PREPROCESSOR FOR AUTOMATIC SPEECH RECOGNITION SYSTEM

[75] Inventor: William Shields Neely, Campbell, Calif.

[73] Assignee: National Semiconductor Corporation, Santa Clara, Calif.

[21] Appl. No.: 610,725

[22] Filed: Mar. 4, 1996

[51] Int. Cl.$^6$ .................................................. G10L 7/00
[52] U.S. Cl. .................................. 704/232; 704/246
[58] Field of Search ........................... 395/2.55, 2.41, 395/2.09, 2.11; 704/246, 232, 202, 200

[56] References Cited

U.S. PATENT DOCUMENTS

| | | | |
|---|---|---|---|
| 5,315,704 | 5/1994 | Shinta et al. | 395/2.41 |
| 5,461,696 | 10/1995 | Frank et al. | 395/2.41 |
| 5,479,563 | 12/1995 | Yamaguhi | 395/2.41 |
| 5,509,103 | 4/1996 | Wang | 395/2.41 |
| 5,581,658 | 12/1996 | O'hagen et al. | 395/2.41 |
| 5,586,215 | 12/1996 | Stork et al. | 395/2.41 |

OTHER PUBLICATIONS

John Lazzaro, John Wawrzynek and Alan Kramer, "Systems Technologies for Silicon Auditory Models", IEEE Micro, Jun. 1994, pp. 7–15.

Richard F. Lyon and Carver Mead, "An Analog Electronic Cochlea", IEEE Transactions On Acoustics, Speech; and Signal Processing, vol. 36, No. 7, Jul. 1988, pp. 1119–1134.

John Lazzaro, John Wawrzynek, M. Mahowald, Massimo Sivilotti and Dave Gillespie, "Silicon Auditory Processors as Computer Peripherals", IEEE Transactions on Neural Networks, vol. 4, No. 3, May 1993, pp. 523–527.

Nicholas Wickström and Pär W¶xnäs "Speech Enhancement using Artificial Neural Networks", Master's Thesis, Centre for Computer Architecture, CCA Halmstad University, Sweden, Jun. 1995, pp. 1–45.

Shin'ichi Tamura, "An Analysis of a Noise Reduction Neural Network", in Proc. ICASSP, Glasgow, Scotland, May 1989, pp. 2001–2004.

Shin'ichi Tamura and Alex Waibel, "Noise Reduction Using Connectionist Models", in Proc. ICASSP, New York, NY, Apr. 1988, pp. 553–556.

D.E. Rumelhart, G.E. Hinton, and R.J. Williams, "Learning Internal Representations By Error Propagation", Parallel Distributed Processing: Explorations in the Microstructures of Cognition, vol. 1, Chapter 41, 1986, pp. 675–682.

Oded Ghitza, "Auditory Nerve Representation as a Basis for Speech Processing", Edited by Sadaoki Furui and M. Mohan Sondhi, Advance in Speech Signal Processing, 1991, pp. 453–485.

Oded Ghitza, "Auditory nerve representation as a front–end for speech recognition in a noisy environment," Computer Speech & Language, 1986, 1, pp. 109–130.

*Primary Examiner*—Allen R. MacDonald
*Assistant Examiner*—Richemond Dorvil
*Attorney, Agent, or Firm*—Limbach & Limbach L.L.P.

[57] ABSTRACT

A preprocessor for automatic speech recognition based upon auditory modeling includes a tapped delay line and a neural network in the form of a multilayer perceptron. The tapped delay line receives an analog speech signal and provides multiple time delayed samples thereof in parallel as inputs for the neural network. The single analog output of the neural network is suitable for interfacing with a signal processor for further processing of the speech information using spectral signal analysis so as to provide a speech representation with desirable characteristics of an auditory based spectral analysis model while simultaneously maintaining a standard analog signal interface.

20 Claims, 3 Drawing Sheets

PREPROCESSOR FOR AUTOMATIC SPEECH RECOGNITION SYSTEM

BACKGROUND OF THE INVENTION

1. Field of the Invention

The present invention relates to signal processors used for automatic speech recognition, and in particular, to signal processors used for automatic speech recognition based upon auditory modeling.

2. Description of the Related Art

Referring to FIG. 1, automatic speech recognition (ASR) systems using spectral analysis must be capable of compensating for noise and distortion introduced by the channel, or path, through which the information must travel after its emission by the speaker. Sources of noise and distortion include the environment, or background, surrounding the speaker and/or microphone, plus attenuation and reflections due to the positioning of the microphone in relation to the speaker. The problems caused by these effects are of particular concern in ASR systems having large vocabularies due to the subtle distinctions such systems must be capable of discerning between various speech patterns.

Referring to FIG. 2, one technique which has been proposed to address such problems is that of using ASR systems based upon auditory models. However, while such systems are claimed to be capable of solving such channel-caused problems, their implementations have not proven to be practical due to their extensive hardware and software requirements for producing appropriate auditory coefficients.

SUMMARY OF THE INVENTION

In accordance with the present invention, a hardware-based neural network preprocesses a speech signal for further processing by an ASR system. Such preprocessing shapes the spectral coefficients in such a manner as to cause them to have the properties of the auditory coefficients of an auditory model. This allows a conventional computationally-efficient ASR system to be used, such as one which uses mel-frequency cepstral coefficients (MFCC), while at the same time providing the advantages of the superior noise and channel characteristics and avoiding the disadvantages of the intensive computation requirements otherwise associated with the use of auditory models.

A preprocessor for automatic speech recognition based upon auditory modeling in accordance with the present invention includes two signal processors. The first signal processor is for receiving a speech signal corresponding to an acoustic stimulus and having a speech spectrum envelope associated therewith and in accordance therewith providing a plurality of temporally related signals. The second signal processor is coupled to the first signal processor and is for receiving and processing the plurality of temporally related signals together simultaneously and in accordance therewith providing a single processed signal which represents a sequence of preprocessed acoustic feature vectors corresponding to the speech spectrum envelope.

In accordance with one embodiment of the present invention, the second signal processor is a neural network with a plurality of inputs for receiving the plurality of temporally related signals and a single output for providing the single processed signal. In one version of this embodiment, the neural network is a multiple layer perceptron. In another version of this embodiment, the preprocessor includes a second neural network which is coupled to the first neural network and is for receiving and further processing the single processed signal to provide a processed output which includes a sequence of processed acoustic feature vectors representing the speech spectrum envelope. In still another version of this embodiment, the second neural network is a mel-frequency cepstral coefficients generator.

In accordance with another embodiment of the present invention, the preprocessor includes a third signal processor which is coupled to the second signal processor and is for receiving and further processing the single processed signal to provide a processed output which includes a sequence of processed acoustic feature vectors representing the speech spectrum envelope.

These and other features and advantages of the present invention will be understood upon consideration of the following detailed description of the invention and the accompanying drawings.

DETAILED DESCRIPTION OF THE INVENTION

Figure 3:
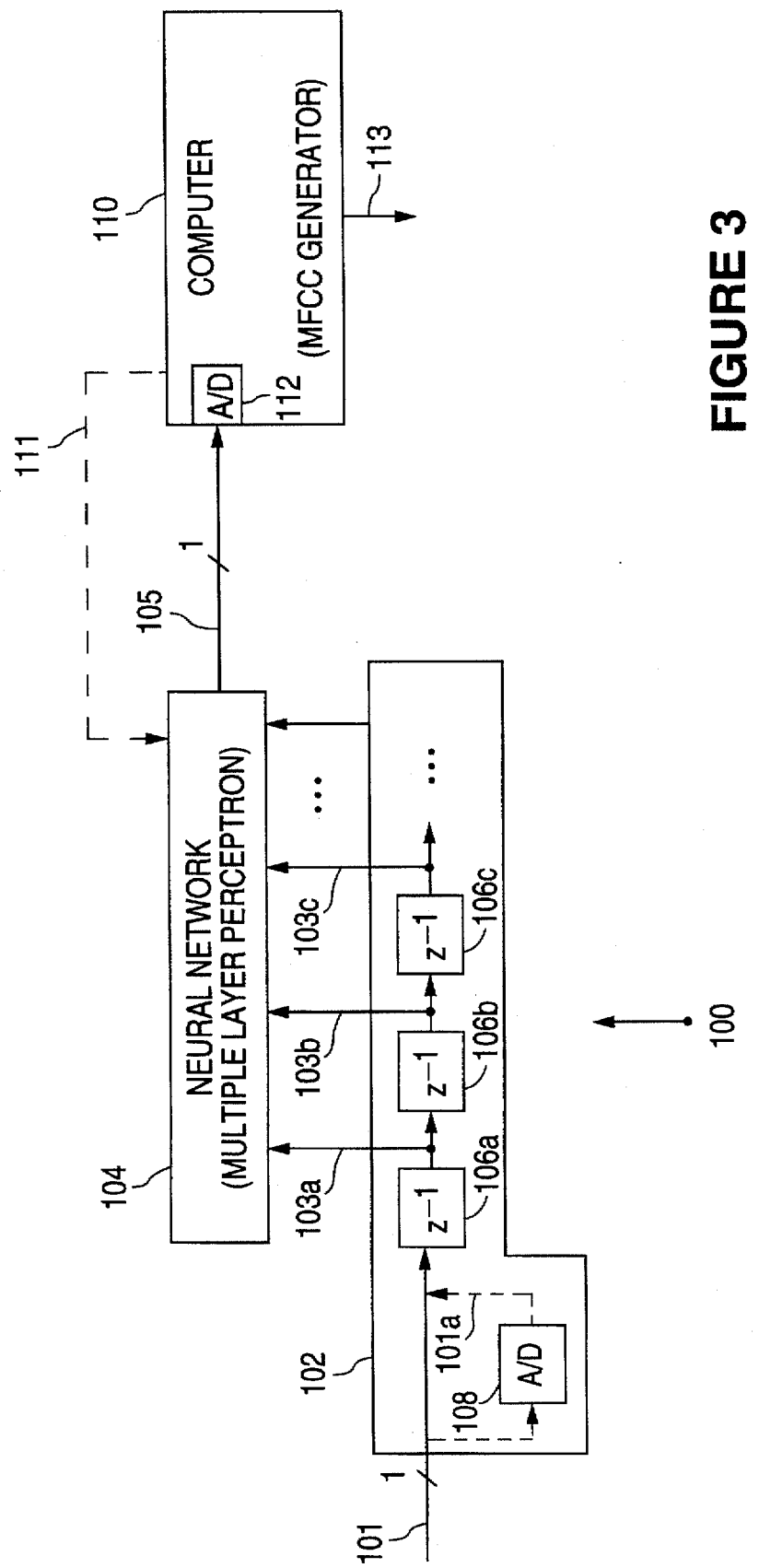
FIG. 3 is a functional block diagram of a preprocessor for automatic speech recognition in accordance with one embodiment of the present invention.

Referring to FIG. 3, a preprocessor 100 for automatic speech recognition in accordance with one embodiment of the present invention includes two signal processors 102, 104. The first signal processor 102 includes a series of unit time delay elements 106 which receive the analog speech signal 101 and sequentially time delay it with the unit time delay elements 106 to produce a series of discrete samples 103 of the analog input signal 101. According to one embodiment, this processor 102 consists of a tapped delay line. According to another embodiment, this processor 102 consists of an analog-to-digital converter 108 and a serial shift register. The analog-to-digital converter 108 digitizes the analog speech signal 101 and the individual register elements 106 of the shift register serially shift the digitized speech signal 101a to produce the speech signal samples 103.

The second processor 104 is a neural network, e.g., a multiple layer perceptron (discussed in more detail below). This neural network 104 receives the speech signal samples 103 and processes them to produce a single analog output signal 105 as a preprocessed speech signal representing a sequence of preprocessed acoustic feature vectors (discussed in more detail below) corresponding to the speech spectrum envelope of the input analog speech signal 101.

This analog preprocessed speech signal 105 is suitable for further processing by a computer 110 which actually performs the automatic speech recognition process. This analog signal 105 is first digitized by an analog-to-digital converter 112 within the computer 110 to provide a digital signal for processing by the computer 110. In one embodiment, this computer 110 is a MFCC generator which, using the preprocessed speech signal 105, generates the necessary auditory coefficients 113 for providing the appropriate auditory model to be used in the performance of the speech recognition.

Initially, when the neural network 104 for the preprocessor 100 is first constructed, a MFCC generator in the form of another neural network 110a is substituted for the computer 110. After first being trained to generate MFCC coefficients, the interneural weights of this neural network MFCC generator 110a are fixed. This neural network MFCC generator 110a is then interconnected with the neural network 104 for the preprocessor 100. Using appropriate training inputs for the analog speech signal 101, this combination of the neural network MFCC generator 110a and preprocessor neural network 104 are then trained together for generating the appropriate corresponding auditory coefficients 113. During this training, the interneural weights of the preprocessor neural network 104 are adjusted by back propagating an error signal 111 from the neural network MFCC generator 110a.

Figure 1:
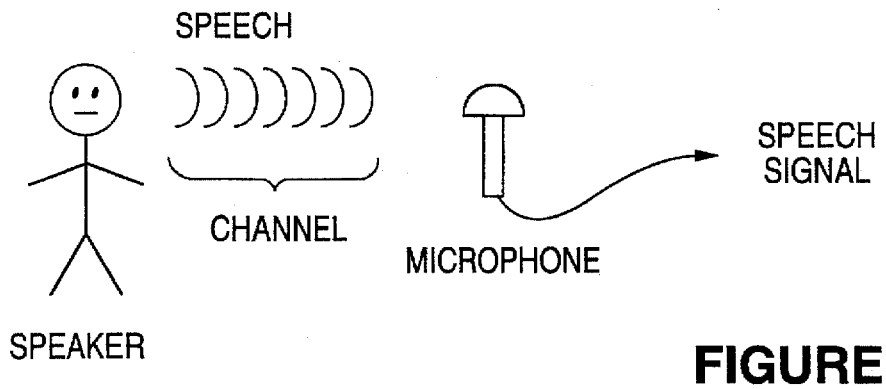
FIG. 1 illustrates conceptually the channel which exists between a speaker and a microphone and which is responsible for introducing noise, distortion and position dependency problems to ASR systems.
Figure 2:
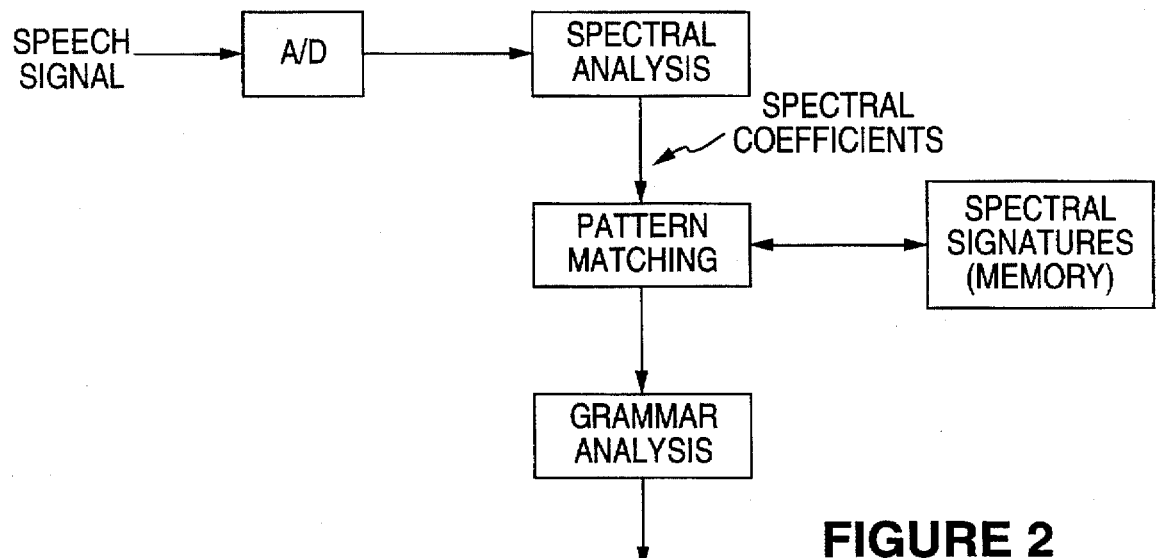
FIG. 2 is a functional block diagram of a conventional ASR system.
Figure 4:
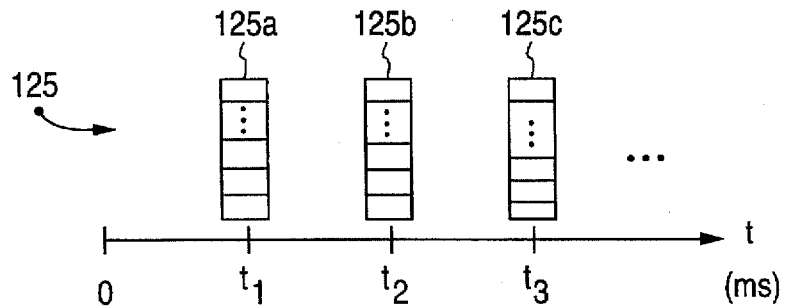
FIG. 4 is a conceptual representation of the sequence of acoustic feature vectors generated by the preprocessor of FIG. 3.

Referring to FIG. 4, as discussed above, the analog output signal 105 as a preprocessed speech signal represents a sequence of preprocessed acoustic feature vectors 125 which includes individual vectors 125a, 125b, 125c, ..., each of which includes multiple scalar elements and is generated at regular intervals. For example, such a vector 125 may include ten or more elements and be produced by the preprocessor 100 every 30 milliseconds ($t_1$=30 ms, $t_2$-$t_1$=30 ms, $t_3$-$t_2$=30 ms, ...). These acoustic feature vectors 125 together approximate the envelope of the speech spectrum of the input speech signal 101. These vectors 125 are used by the computer 110 to perform the speech recognition by transforming this sequence of acoustic feature vectors 125 using a set of acoustic models corresponding to basic speech units, a lexicon defining the vocabulary in terms of such speech units and a language model specifying the allowable sequences of vocabulary elements.

Figure 5:
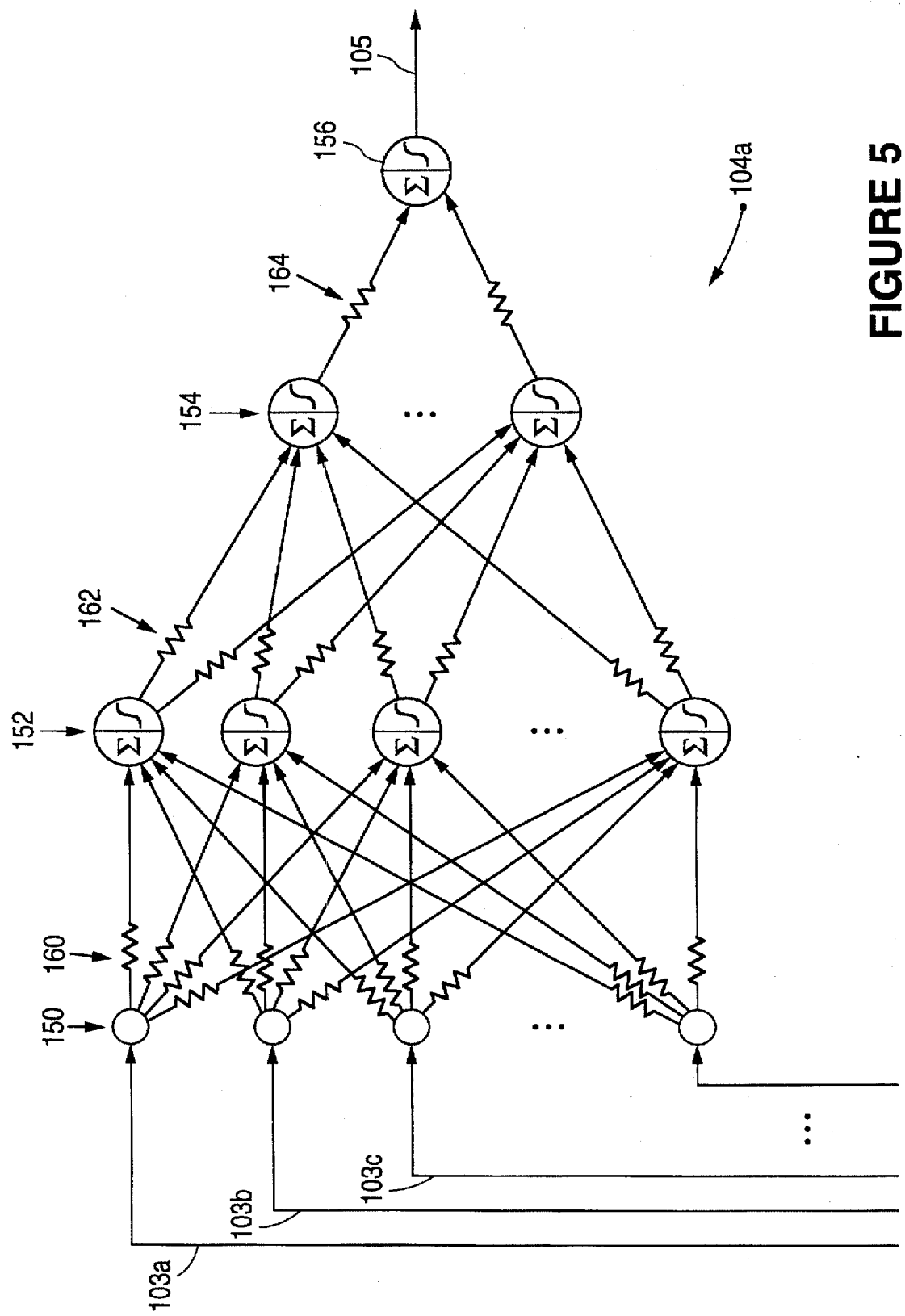
FIG. 5 is a functional block diagram of a multiple layer perceptron for use as the neural network in the preprocessor of FIG. 3.

Referring to FIG. 5, a neural network in the form of a multiple layer perceptron (MLP) 104a suitable for use as the neural network 104 includes an input layer of distribution nodes 150, two hidden layers of neurons 152, 154, and an output layer neuron 156. In accordance with conventional neural network technology, the layers are fully interconnected with their adjacent layers with individual interneural weights 160, 162, 164 interconnecting the individual nodes 150 and neurons 152, 154, 156. Each neuron 152, 154, 156 performs a summation of its respective weighted inputs followed by a nonlinear function (e.g. sigmoid) to generate its output.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a preprocessor for automatic speech recognition based upon auditory modeling, said preprocessor comprising:

a first signal processor for receiving a speech signal corresponding to an acoustic stimulus and having a speech spectrum envelope associated therewith and in accordance therewith providing a plurality of sequential time interval samples of said speech signal; and a second signal processor, coupled to said first signal processor, for receiving and processing said plurality of sequential time interval samples of said speech signal together simultaneously and in accordance therewith providing a single processed signal which represents a sequence of preprocessed acoustic feature vectors corresponding to said speech spectrum envelope.

2. The apparatus of claim 1, wherein said first signal processor comprises a tapped delay line and said plurality of sequential time interval samples of said speech signal comprises a plurality of sequentially time delayed signals.

3. The apparatus of claim 1, wherein said speech signal comprises an analog speech signal and said first signal processor comprises:

an analog-to-digital converter for receiving and digitizing said analog speech signal to provide a digital speech signal; and a shift register, which includes a plurality of outputs and is coupled to said analog-to-digital converter, for receiving and selectively shifting said digital speech signal to provide said plurality of sequential time interval samples of said speech signal.

4. The apparatus of claim 1, wherein said second signal processor comprises a first neural network which includes a plurality of inputs for receiving said plurality of sequential time interval samples of said speech signal and a single output for providing said single processed signal.

5. The apparatus of claim 4, wherein said first neural network comprises a multiple layer perceptron.

6. The apparatus of claim 4, further comprising a second neural network, coupled to said first neural network, for receiving and further processing said single processed signal to provide a processed output which represents said speech spectrum envelope.

7. The apparatus of claim 6, wherein said first and second neural networks together receive and cooperatively process a plurality of training signals by back-propagating errors in said processed output through said second and first neural networks.

8. The apparatus of claim 1, further comprising a third signal processor, coupled to said second signal processor, for receiving and further processing said single processed signal to provide a processed output which includes a sequence of processed acoustic feature vectors representing said speech spectrum envelope.

9. The apparatus of claim 8, wherein said third signal processor comprises a mel-frequency cepstral coefficients generator.

10. The apparatus of claim 9, wherein said mel-frequency cepstral coefficients generator comprises a computer programmed to generate a plurality of auditory coefficients based upon said single processed signal.

11. A method of preprocessing a signal for automatic speech recognition based upon auditory modeling, said method comprising the steps of:

receiving and processing a speech signal corresponding to an acoustic stimulus and having a speech spectrum envelope associated therewith and in accordance therewith generating a plurality of sequential time interval samples of said speech signal; and processing said plurality of sequential time interval samples of said speech signal together simultaneously and in accordance therewith generating a single processed signal which represents a sequence of preprocessed acoustic feature vectors corresponding to said speech spectrum envelope.

12. The method of claim 11, wherein said step of receiving and processing a speech signal corresponding to an acoustic stimulus and having a speech spectrum envelope associated therewith and in accordance therewith generating a plurality of sequential time interval samples of said speech signal comprises propagating said speech signal via a delay line and tapping said delay line to generate a plurality of sequentially time delayed signals as said plurality of sequential time interval samples of said speech signal.

13. The method of claim 11, wherein said speech signal comprises an analog speech signal and said step of receiving and processing a speech signal corresponding to an acoustic stimulus and having a speech spectrum envelope associated therewith and in accordance therewith generating a plurality of sequential time interval samples of said speech signal comprises the steps of:

digitizing said analog speech signal to generate a digital speech signal; and selectively shifting said digital speech signal to generate a plurality of output signals as said plurality of sequential time interval samples of said speech signal.

14. The method of claim 11, wherein said step of processing said plurality of sequential time interval samples of said speech signal together simultaneously and in accordance therewith generating a single processed signal which represents a sequence of preprocessed acoustic feature vectors corresponding to said speech spectrum envelope comprises inputting said plurality of sequential time interval samples of said speech signal as a plurality of inputs to a first neural network and outputting a single output therefrom as said single processed signal.

15. The method of claim 14, wherein said step of inputting said plurality of sequential time interval samples of said speech signal as a plurality of inputs to a first neural network and outputting a single output therefrom as said single processed signal comprises inputting said plurality of sequential time interval samples of said speech signal as a plurality of inputs to a multiple layer perceptron and outputting a single output therefrom as said single processed signal.

16. The method of claim 14, further comprising the step of further processing said single processed signal with a second neural network to provide a processed output which represents said speech spectrum envelope.

17. The method of claim 16, further comprising the step of receiving and cooperatively processing with said first and second neural networks together a plurality of training signals by back-propagating errors in said processed output through said second and first neural networks.

18. The method of claim 11, further comprising the step of further processing said single processed signal to provide a processed output which includes a sequence of processed acoustic feature vectors representing said speech spectrum envelope.

19. The method of claim 18, wherein said step of further processing said single processed signal to provide a processed output which includes a sequence of processed acoustic feature vectors representing said speech spectrum envelope comprises further processing said single processed signal with a mel-frequency cepstral coefficients generator.

20. The method of claim 19, wherein said step of further processing said single processed signal with a mel-frequency cepstral coefficients generator comprises further processing said single processed signal with a computer programmed to generate a plurality of auditory coefficients based upon said single processed signal.

* * * * *